(12) United States Patent
Takahashi

(10) Patent No.: US 6,268,674 B1
(45) Date of Patent: *Jul. 31, 2001

(54) MAGNETIC BEARING APPARATUS

(75) Inventor: Hiroshi Takahashi, Kanagawa-ken (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,585

(22) Filed: May 12, 1999

(30) Foreign Application Priority Data

May 15, 1998 (JP) .................................. 10-132827

(51) Int. Cl.[7] ...................................................... H02K 7/09
(52) U.S. Cl. ............................................ 310/90.5; 310/261
(58) Field of Search ................................... 310/90.5, 178, 310/261

(56) References Cited

U.S. PATENT DOCUMENTS

| 3,934,950 | * | 1/1976 | Kuhlmann | 310/90.5 |
|---|---|---|---|---|
| 4,000,929 | * | 1/1977 | Studer | 310/90.5 |
| 4,077,678 | * | 3/1978 | Studer et al. | 310/90.5 |
| 4,180,296 | * | 12/1979 | Habermann | 310/90.5 |
| 4,470,644 | * | 9/1984 | Weisser | 310/90.5 |
| 4,483,570 | * | 11/1984 | Inoue | 310/90.5 |
| 4,720,649 | * | 1/1988 | Habermann et al. | 310/90.5 |
| 4,879,500 | * | 11/1989 | Kanemitsu | 318/632 |
| 4,920,291 | * | 4/1990 | McSparran | 310/90.5 |
| 4,940,878 | * | 7/1990 | McKee et al. | 219/121.64 |
| 4,983,870 | * | 1/1991 | McSparran | 310/90.5 |
| 5,216,308 | * | 6/1993 | Meeks | 310/90.5 |
| 5,319,274 | * | 6/1994 | New | 310/90.5 |
| 5,385,007 | * | 1/1995 | Hartel et al. | 57/76 |
| 5,514,924 | * | 5/1996 | McMullen et al. | 310/90.5 |
| 5,543,673 | * | 8/1996 | Katsumata et al. | 310/90.5 |
| 5,720,160 | * | 2/1998 | Traxler et al. | 57/76 |
| 5,729,065 | * | 3/1998 | Fremery et al. | 310/90.5 |

FOREIGN PATENT DOCUMENTS

| 52-33011 | | 5/1977 | (JP) . |
|---|---|---|---|
| 60-14931 | | 4/1985 | (JP) . |
| 5-31684 | | 4/1993 | (JP) . |
| 11101233A | * | 4/1999 | (JP) . |
| 11325073A | * | 11/1999 | (JP) . |
| 95/35447 | * | 12/1995 | (WO) . |
| 96/18818 | * | 6/1996 | (WO) . |

* cited by examiner

*Primary Examiner*—Joseph Waks
(74) *Attorney, Agent, or Firm*—Foley & Lardner

(57) ABSTRACT

A magnetic bearing apparatus is capable of supporting a rotatable rotor in a non-contact manner. The apparatus includes a plurality of electromagnets and a slit. The electromagnets are disposed around the rotor and support the rotor in a non-contact manner in an axial direction of the rotor and a radial direction thereof by a magnetic attraction force. At least one slit is formed in the rotor at a predetermined angle for making the conductivity discontinuous with respect to the rotational direction of the rotor. This construction makes it possible to cut an eddy current loss, which is induced when the rotor is rotated.

20 Claims, 15 Drawing Sheets

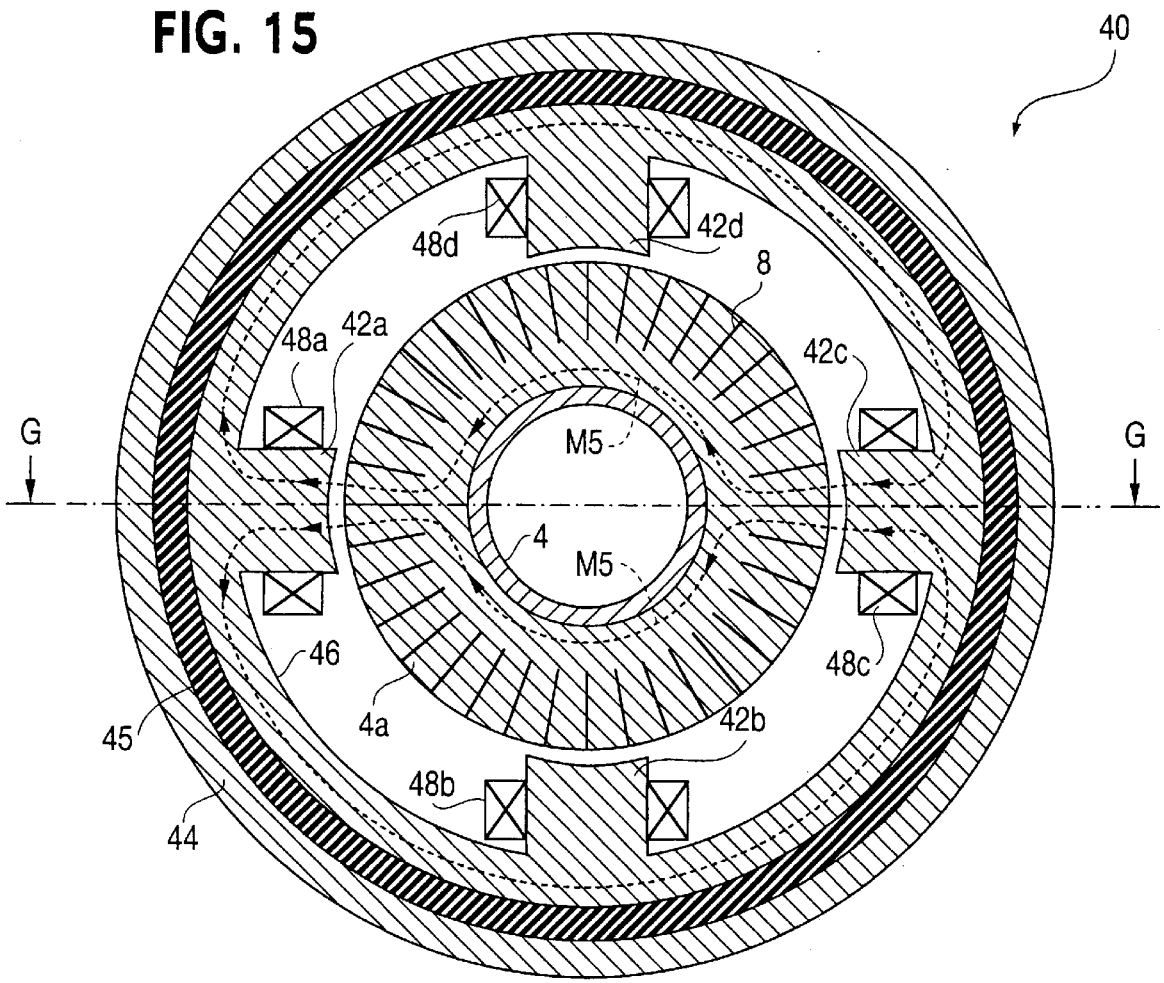

MAGNETIC BEARING APPARATUS

BACKGROUND

1. Field of the Invention

The present invention relates to a magnetic bearing apparatus and more particularly to a magnetic bearing apparatus capable of being used under a clean atmosphere, for example, a semiconductor fabrication process, and capable of reducing in size in the rotational axis thereof.

2. Description of the Related Art

At present, a ball bearing is mainly employed as a bearing member for supporting a rotor in a rotational manner, such as a chemical vapor deposition (CVD) apparatus for growing a thin film of a predetermined component over a semiconductor substrate or a wafer.

Such chemical vapor deposition apparatus needs to be run in an evacuated clean atmosphere. In the current apparatus that uses the ball bearing as its component, however, a lubricating oil of the ball bearing will diffuse to contaminate the thin film to be formed on the wafer, thereby lowering the production yield. Further, rust on the ball bearing causes not only contamination in the clean atmosphere, but also results in imperfections on the outer surface of the ball bearing itself, thereby making the stable rotation thereof impossible. In this case, the ball bearing has to be replaced with a new one. However, this replacement adds time and cost in the fabrication process.

Therefore, investigations have been made to employ a magnetic bearing as a component in place of the ball bearing. The magnetic bearing has been developed in various researches and applications in numerous aspects due to non-contact, no lubrication requirements, and long lifetime characteristics.

A current magnetic bearing apparatus is constituted, for example, as shown in FIG. 1. This magnetic bearing apparatus 90 includes: a cylindrical rotor 93 accommodated in a casing 91 and equipped with a thrust disk 93a at the lower end side of a rotational axis 92, and electromagnets 94a and 94b constituting a thrust magnetic bearing 94 for supporting the rotor 93 in a non-contact manner in the thrust direction by making their magnetic poles face (or confront) each other through gaps in the upper and lower surfaces of the thrust disk 93a. The rotor 93 is supported in a non-contact manner in the radial direction by radial magnetic bearings 95 and 96 which are disposed at the upper portion and the lower portion of the rotational axis 92, and is rotationally driven on the rotational axis 92 by an electric motor 97.

The radial magnetic bearings 95 and 96 include: cylindrical laminated yoke portions 93b and 93c fixed on the rotor 93 such that they are laminated in the direction of the rotational axis 92, and upper electromagnets 95a, 95b, 95c and 95d (the electromagnets 95b and 95d are not shown) and lower electromagnets 96a, 96b, 96c and 96d (the electromagnets 96b and 96d are not shown) fixed on the casing 91 at positions to face (or confront) the yoke portions 93b and 93c and are proportionally divided into four segments (quadri-divided) in the circumferential direction.

Moreover, displacement sensors (not shown) for detecting the axial and radial displacements of the rotor 93 is disposed in the casing 91 so that the thrust magnetic bearing 94 and the radial magnetic bearings 95 and 96 are controlled by the control signals produced in a control unit (not shown) in accordance with the detected displacements.

In the magnetic bearing apparatus as constituted above, the thrust magnetic bearing 94, the radial magnetic bearings 95 and 96, the displacement sensors (not shown) and the electric motor 97 are disposed along the direction of the rotating axis 92. This construction elongates the magnetic bearing apparatus in the direction of the rotational axis 92. Because the laminated yoke portions 93b and 93c in the rotor 93 are exposed at their laminated end surfaces to the inside of the evacuated casing 91, rust, if allowed to grow due to environmental circumstances, will be scattered by the rotations of the rotor 93 to contaminate the inside of the casing 91. In the CVD apparatus, especially, the thin film to be formed over the wafer may be contaminated, resulting in a lower production yield.

The magnetic bearing apparatus thus described is elongated in the direction of the rotational axis because the radial magnetic bearings are disposed at a plurality of positions along the axial direction. Further, rust on the end surfaces exposed to the inside of the casing of the laminated yokes may contaminate the inside of the casing.

SUMMARY OF THE INVENTION

The present invention has been made in view of the above-mentioned circumstances and is intended to solve the above-mentioned problems. In particular, an object of the present invention is to provide a magnetic bearing apparatus which can be reduced in size in the rotational axis and which can avoid contamination in the inside thereof. Additional objects and advantages of the invention may be apparent from the following description or may be learned by practice of the invention.

The present invention provides a magnetic bearing apparatus capable of supporting a rotatable rotor in a non-contact manner, including a plurality of electromagnets disposed around the rotor for supporting the rotor in a non-contact manner in the axial direction of the rotor and the radial direction thereof by a magnetic attraction force, and a conductivity adjusting unit disposed at positions to face the electromagnets of the rotor for making the conductivity discontinuous with respect to the rotational direction of the rotor.

The conductivity adjustment unit may include a slit formed in the rotor. The conductivity adjustment unit may also include an anisotropic conductive material applied on the rotor.

The slit may be formed in a planes containing the axis direction of the rotor and the radial direction thereof. The electromagnets may include a first magnetic bearing that supports the rotor in the axial direction, and a second magnetic bearing that supports the rotor in the radial direction.

The rotor may include a disk around the surface of the rotor, and the slit may be formed in the disk. At least one of the electromagnets may face this disk.

The rotor may be cylindrically shaped. At least one of the electromagnets may be disposed so as to face the outer surface of the rotor, and at least one of the electromagnets may be disposed so as to face the inner surface of the rotor.

The present invention may further include a motor that rotates the rotor. The motor may be disposed so as to face the outer surface of the rotor, and may be disposed so as to face the inner surface of the rotor.

The present invention may further include a plurality of displacement sensors that detect the displacement of the rotor in the axial direction and the radial direction thereof. The displacement sensors may include a first sensor that detects the displacement of the rotor in the axial direction, and a second displacement sensor that detects the displacement of the rotor in the radial direction. At least one of the displacement sensors may be faced so as to detect the displacement of the disk.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 15 is a diagram showing the flows of magnetic fluxes of the thrust magnetic bearing and the radial magnetic bearing with reference to the sectional view shown in FIG. 13.

DESCRIPTION OF THE PREFERRED EMBODIMENTS

Embodiments of a magnetic bearing apparatus of the present invention will now be specifically described in more detail with reference to the accompanying drawings. Wherever possible, the same reference numbers will be used throughout the drawings to refer to the same or like parts.

Figure 1:
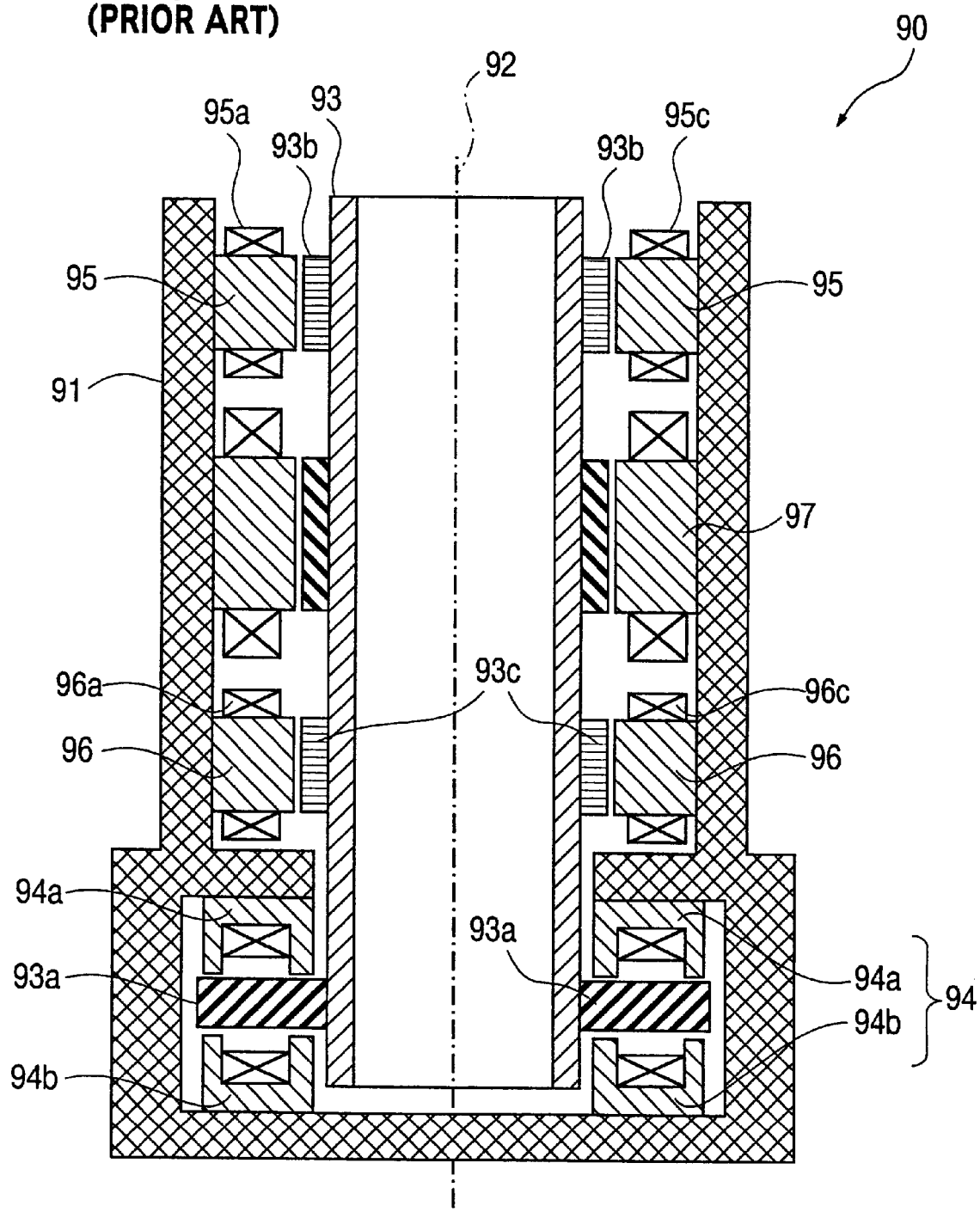
FIG. 1 is a side sectional view showing a conventional magnetic bearing apparatus.
Figure 2:
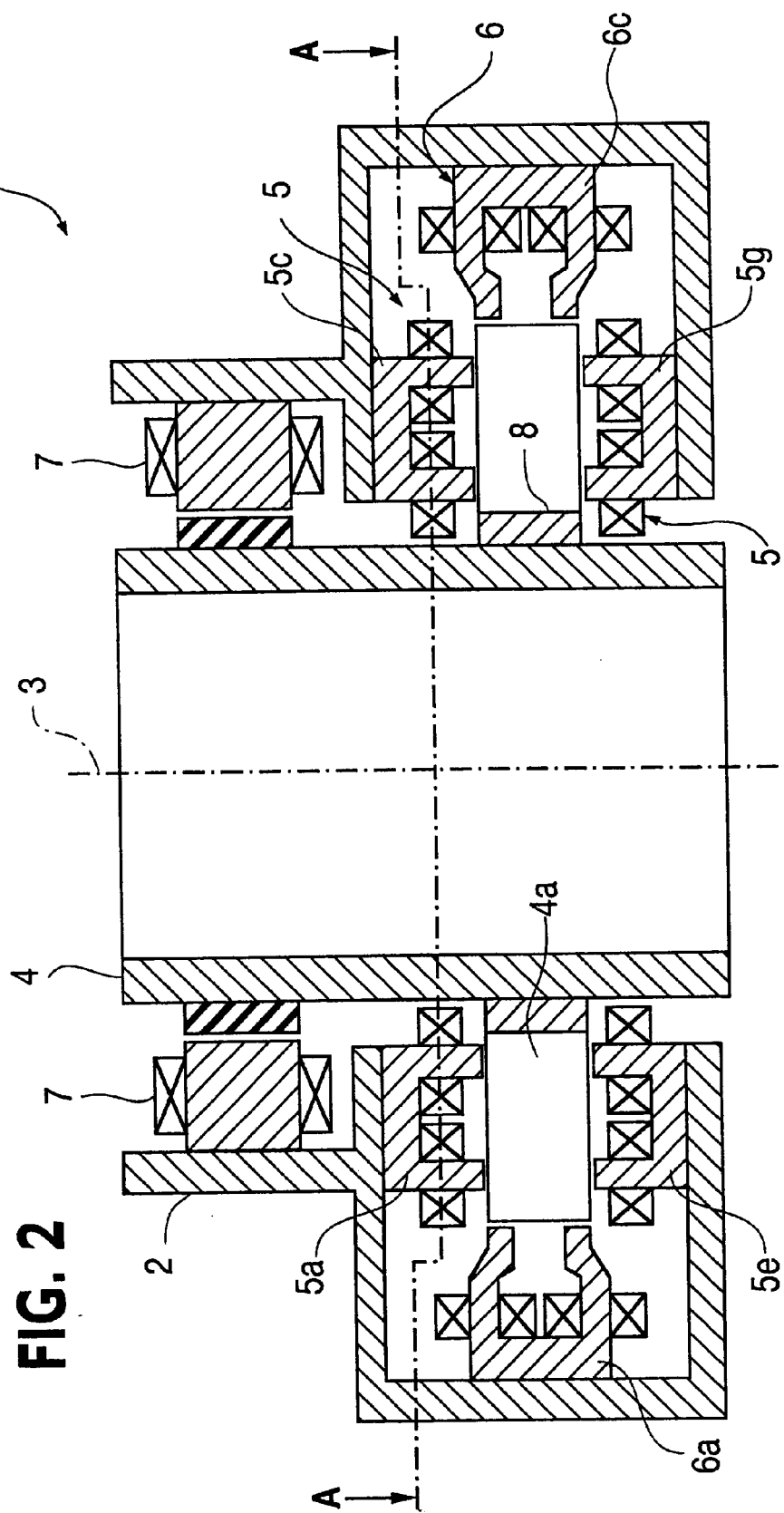
FIG. 2 is a side sectional view showing a magnetic bearing apparatus according to a first embodiment of the present invention.
Figure 3:
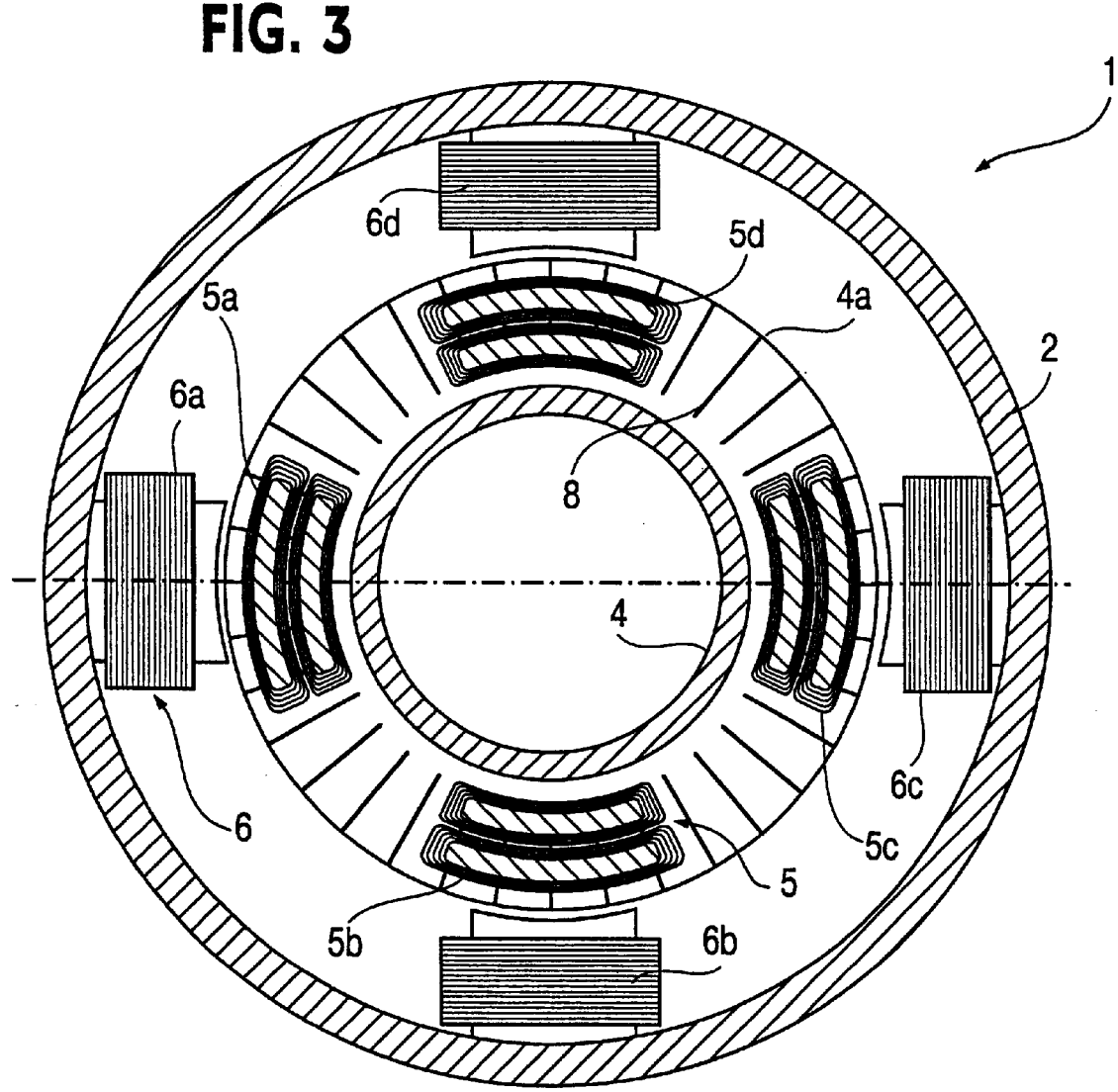
FIG. 3 is a sectional view taken along a line A—A of FIG. 2.

FIG. 2 is a side sectional view showing a magnetic bearing apparatus according to a first embodiment of the present invention, and FIG. 3 is a sectional view taken along a line A—A of FIG. 1.

A rotor 4 in a magnetic bearing apparatus 1 is cylindrically shaped with a ferromagnetic material and is accommodated in a cylindrical shaped casing 2, and is equipped with a disk 4a around the outer surface of the rotor 4 in the vicinity of the lower end of a rotational axis 3. Over and under the plane surfaces of this disk 4a, upper electromagnets (or first electromagnets) 5a, 5b, 5c and 5d (electromagnets 5b and 5d are not shown in FIG. 2, but see FIG. 3) and lower electromagnets (or first electromagnets) 5e, 5f, 5g and 5h (electromagnets 5f and 5h are not shown in FIG.2, but are respectively disposed below electromagnets 5b and 5d when viewed from FIG. 3) are disposed for supporting the rotor 4 in a non-contact manner in the thrust direction (the direction of the rotational axis 3) and in the inclination direction (the direction of inclination of the rotational axis 3) by making their magnetic poles face each other through gaps. These upper electromagnets 5a, 5b, 5c, 5d and the lower electromagnets 5e, 5f, 5g and 5h constitute a first magnetic bearing, and are denoted a thrust magnetic bearing 5 in the figures. Around the outer circumference (or side surface) of the disk 4a of the rotor 4, electromagnets (or first electromagnets) 6a, 6b, 6c and 6d are equipped to support the rotor 4 in a non-contact manner in the radial direction (perpendicular to the rotational axis 3) by making their magnetic poles face each other through gaps. These electromagnets 6a, 6b, 6c and 6d constitute a second magnetic bearing, and are denoted as a radial magnetic bearing 6 in the figures.

Above the electromagnets 5a, 5b, 5c and 5d in the casing 2, an electric motor 7 is disposed for rotating the rotor 4.

In the outer circumference of the disk 4a of the rotor 4, a conductivity adjustment unit is provided. By way of example and not by way of limitation, conductivity adjustment unit is shown as thirty six slits 8, as shown in FIG. 3. The slits 8 are extended through in the direction of the rotational axis 3 and formed in the same intervals respectively along the radial direction. Other numbers of slits may be utilized while remaining within the scope of the invention.

Figure 4:
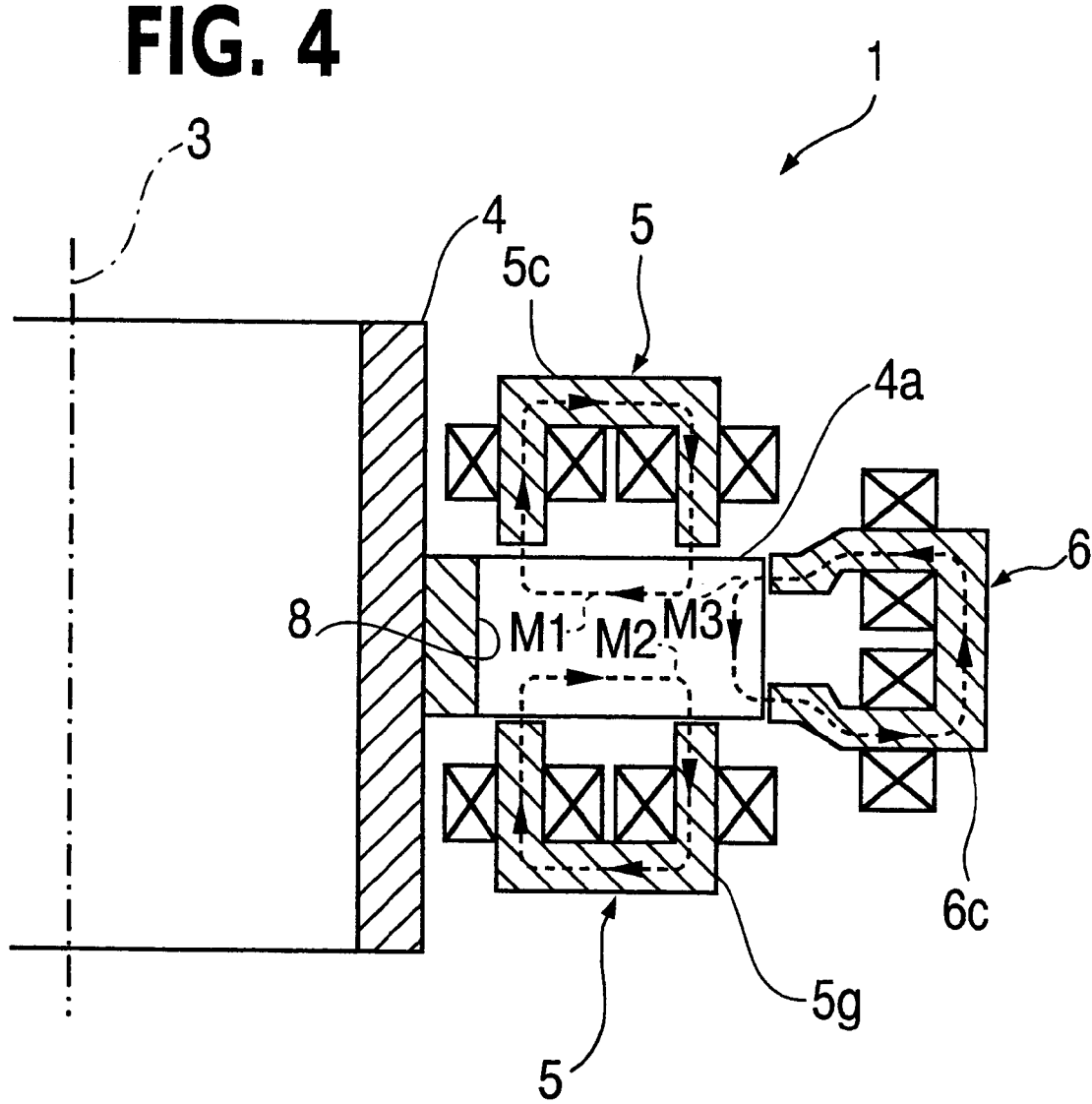
FIG. 4 is a diagram showing the flows of magnetic fluxes of a thrust magnetic bearing and a radial magnetic bearing.

FIG. 4 is a diagram showing flows of magnetic fluxes of the thrust magnetic bearing 5 and the radial magnetic bearing 6. Only the upper electromagnet 5c and the lower electromagnet 5g of the thrust magnetic bearing 5 and the electromagnet 6c of the radial magnetic bearing 6 are shown in an enlarged scale in FIG. 4, with the other electromagnets having similar flows of magnetic fluxes.

The upper electromagnet 5c and the lower electromagnet 5g of the thrust magnetic bearing 5 and the electromagnet 6c of the radial magnetic bearing 6 form a magnetic path in a plane which is approximately parallel to a plane formed by the slits 8 provided in the disk 4a of the rotor 4. A magnetic flux M1 generated by the upper electromagnet 5c of the thrust magnetic bearing 5 flows from the outside to the inside with respect to the radial direction of the disk 4a, and enters the electromagnet yoke through the gap between the upper electromagnet 5c and the disk 4a, thereby constituting a closed loop. A magnetic flux M2 generated by the lower electromagnet 5g of the thrust magnetic bearing 5 flows from the inside to the outside with respect to the radial direction of the disk 4a, and enters the electromagnet yoke through the gap between the lower electromagnet 5g and the disk 4a, thereby constituting a closed loop. A magnetic flux M3 generated by the electromagnet 6c of the radial magnetic bearing 6 flows from the upper side to the lower side with respect to the axial direction of the disk 4a, and enters the electromagnetic yoke through the gap between the electromagnet 6c and the disk 4a, thereby constituting a closed loop. The planes, as formed by those magnetic fluxes M1, M2 and M3, are approximately parallel with the planes formed by the slits 8.

Although the upper electromagnets 5a, 5b and 5d and the lower electromagnets 5e, 5f and 5h of the thrust magnetic bearing 5 and the electromagnets 6a, 6b and 6d of the radial magnetic bearing 6 are not shown, magnetic fluxes flow similar to those of FIG. 4.

Next, the function of providing the conductivity adjusting unit, such as the slits 8 formed in the disk 4 of the present invention, will be explained.

The slits 8 in the disk 4a of the present invention are provided in order to reduce the core loss, especially the eddy current loss, which is generated when the disk 4a of the rotor 4 is rotated by the electric motor 7.

If the slits 8 are not formed, then, when the disk 4a is rotated by the electric motor 7, the eddy current loss occurs at the upper and the lower surfaces and the outer circumference which face the magnetic pole of the upper electromagnets 5a, 5b, 5c and 5d and the lower electromagnets 5e, 5f, 5g and 5h of the thrust magnetic bearing 5 and the electromagnets 6a, 6b, 6c and 6d of the radial magnetic bearing 6. This eddy current loss occurs because the magnetic fluxes of the thrust magnetic bearing 5 and the radial magnetic bearing 6 are distributed nonuniformity in the circumferential direction thereof.

In the conventional magnetic bearing apparatuses, a laminated yoke is widely used to reduce the eddy current loss. The method of reducing the eddy-current loss using the laminated yoke effectively acts on the radial magnetic bearing; however, this effect cannot be expected for the thrust magnetic bearing of the present invention. Therefore, the present invention is provided based on the consideration that the eddy current loss is caused according to the rotation of the rotor 4, in which the disk 4a having the slits 8 is rotated and is surrounded by the radial magnetic bearing and the thrust magnetic bearing.

The eddy current to be induced in the disk 4a by the thrust magnetic bearing 5 and the radial magnetic bearing 6 while the rotor 4 rotates, is shielded by the slits 8 formed in the disk 4a. This is because the eddy current is prevented from migrating in the circumferential direction of the disk 4a by the slits 8. This makes it possible to suppress the generation of the eddy current.

The magnetic bearing apparatus 1 thus constituted according to the first embodiment is provided with the slits 8 that behave as a conductivity adjusting unit so that the thrust magnetic bearing 5 and the radial magnetic bearing 6 can be arranged over and below and around the outer circumference of the disk 4a of the rotor 4 without using the laminated yoke for reducing the eddy current loss. As a result, the length of the axial direction is shortened to provide a compact construction , as compared with the current magnetic bearing apparatus in which a plurality of radial magnetic bearings are disposed along its axial direction as shown in FIG. 1.

Because no laminated yokes need to be employed, it is possible to prevent the contamination of the inside of the casing which might otherwise be caused by rust of the end surface of the laminated yoke, which is exposed to the inside of the casing 2.

It is further possible to reduce or eliminate the unbalance which is caused by the deformation due to the centrifugal force or the difference in the thermal expansion, and which raises a problem when the laminated yoke is employed. Consequently, the performance of the rotational motion of the rotor 4 can be improved to facilitate employment of a large-diameter rotor.

In the construction of FIG. 2, although the electric motor 7 is disposed above the upper electromagnets 5a, 5b, 5c and 5d of the thrust magnetic bearing 5, the construction may be modified such that the electric motor 7 is disposed below the lower electromagnets 5e, 5f, 5g and 5h of the thrust magnetic bearing 5, for example. In FIG. 4, although the magnetic fluxes M1, M2 and M3 of the upper electromagnet 5c and the lower electromagnet 5g of the thrust magnetic bearing 5 and the electromagnet 6c of the radial magnetic bearing 6 are shown, the advantages of the present invention would result be expected if the electromagnets are controlled to reverse the flows of the magnetic fluxes.

Figure 5:
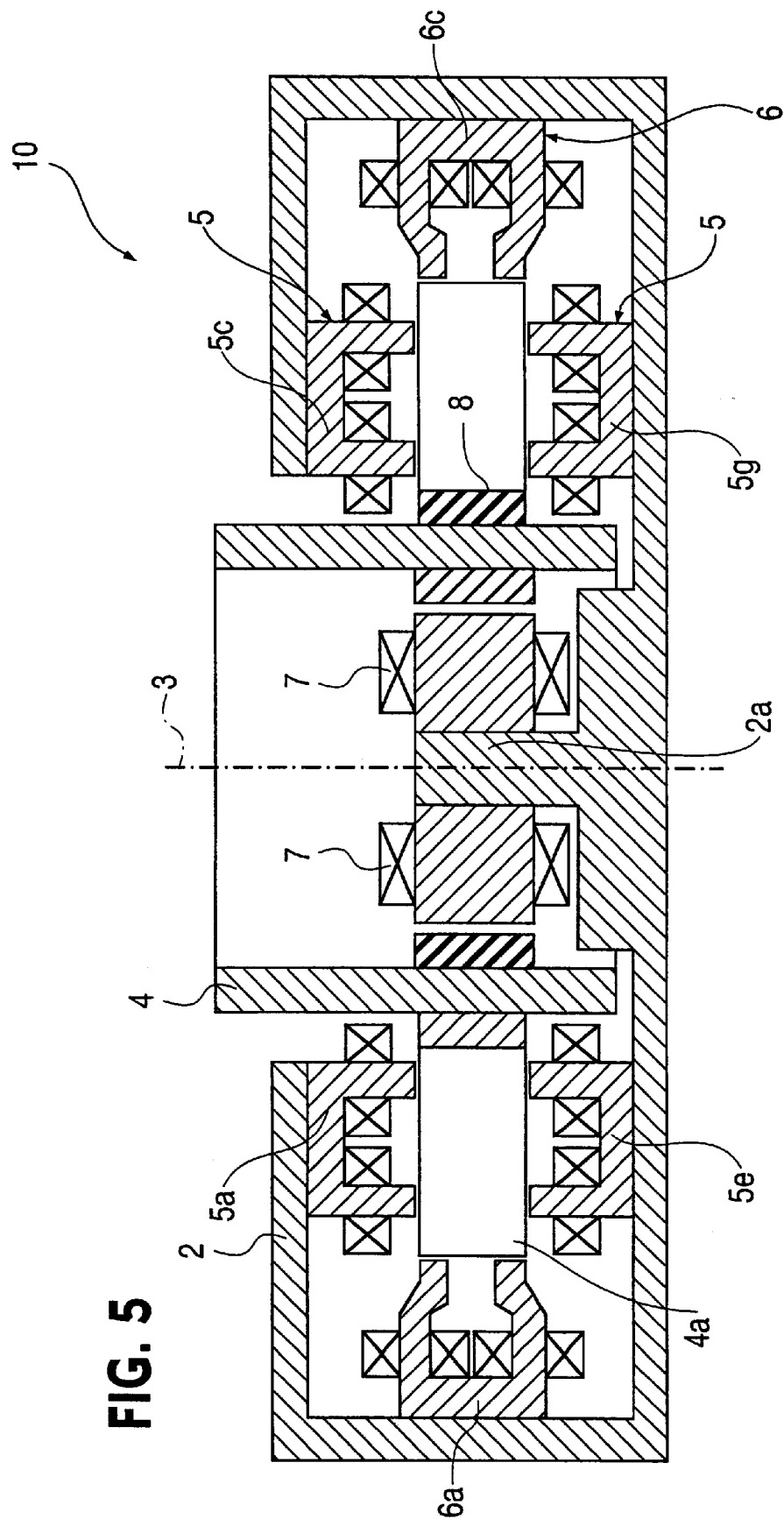
FIG. 5 is a side sectional view showing a magnetic bearing apparatus according to a second embodiment of the present invention.

FIG. 5 is a side sectional view showing a magnetic bearing apparatus 10 according to a second embodiment of the present invention. The magnetic bearing apparatus 10 of this embodiment has the electric motor 7 arranged in the inner circumference of the rotor 4 by forming an insert 2a in the casing 2 that is inserted into the inside space of the rotor 4, and by mounting the electric motor 7 on the insert 2a. This arrangement makes it possible to have the radial magnetic bearing 6 and the electric motor 7 are disposed at the same position, as shown, with respect to the direction of the rotational axis 3.

According to this second embodiment thus constructed, it is possible to provide the compact magnetic bearing apparatus 10 whose size is shorter in the axial direction than that of the first embodiment.

Figure 6:
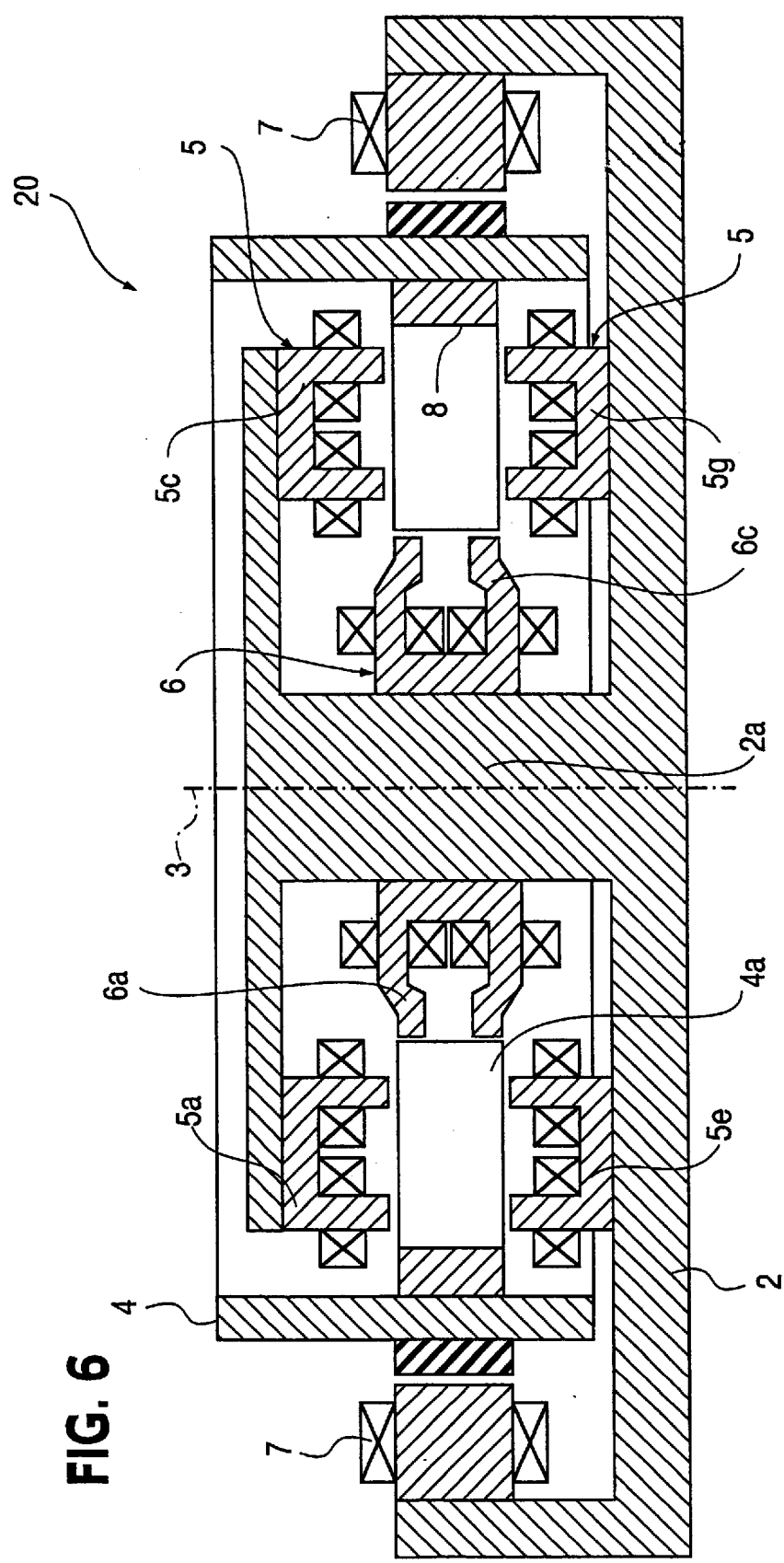
FIG. 6 is a side sectional view showing a magnetic bearing apparatus according to a third embodiment of the present invention.

FIG. 6 is a side sectional view showing a magnetic bearing apparatus 20 according to a third embodiment of the present invention. The magnetic bearing apparatus 20 according to this embodiment has the radial magnetic bearing 6 arranged in the inner circumference of the disk 4a by modifying the shape of the insert 2a of the casing 2 from that shown in FIG. 5, and by mounting the radial magnetic bearing 6 on the modified insert 2a. Here, the electric motor 7 is arranged around the outer circumference of the rotor 4. This arrangement makes it possible to dispose the radial magnetic bearing 6 and the electric motor 7 at the same level, as shown, with respect to the direction of the rotational axis 3.

According to the third embodiment thus constructed, it is possible to provide the compact magnetic bearing apparatus 20 whose size is shortened in the axial direction as in the foregoing embodiments.

Figure 7:
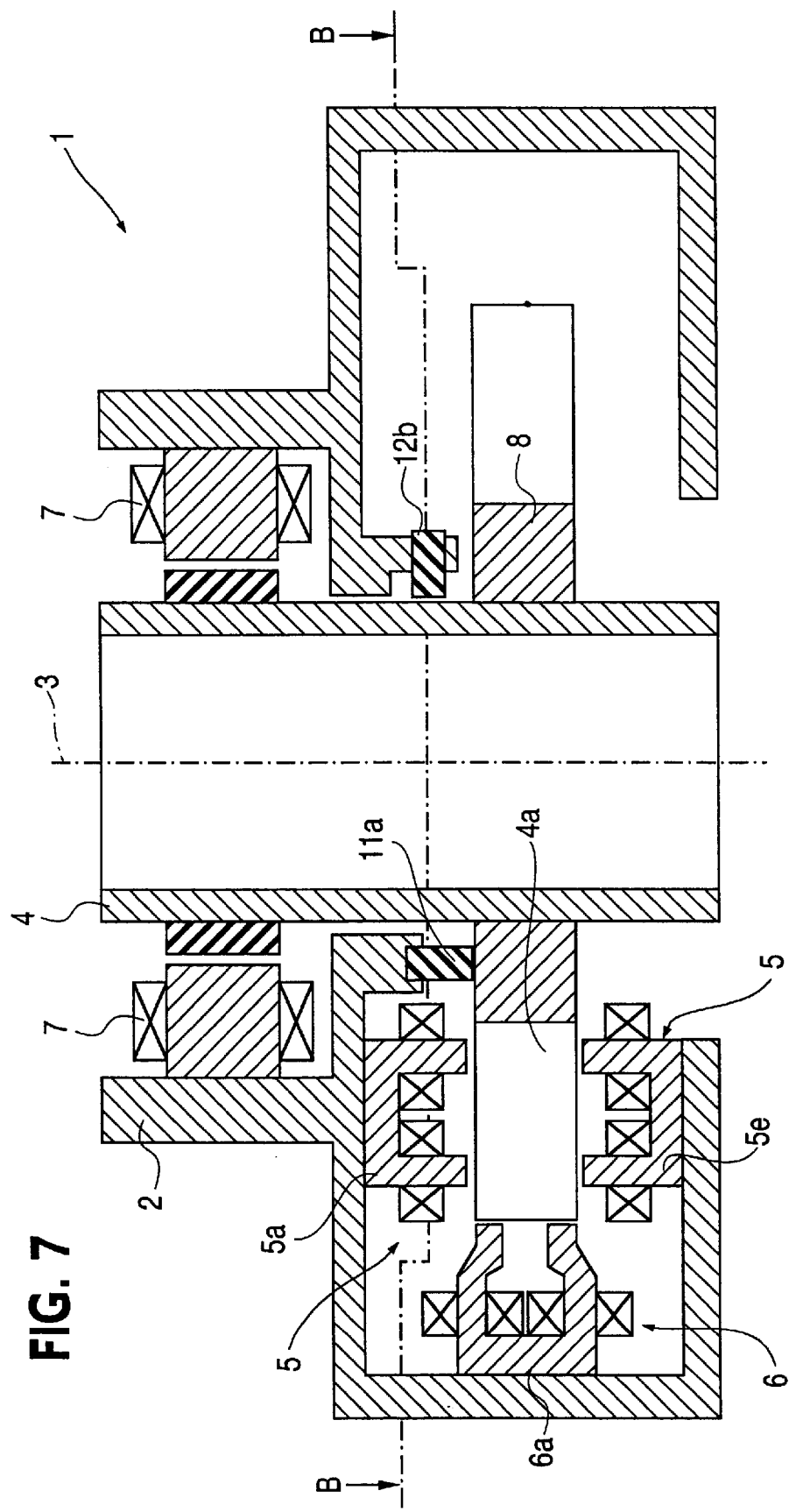
FIG. 7 is a side sectional view showing the arrangement of a displacement sensor of the thrust magnetic bearing and the radial magnetic bearing in the magnetic bearing apparatus.
Figure 8:
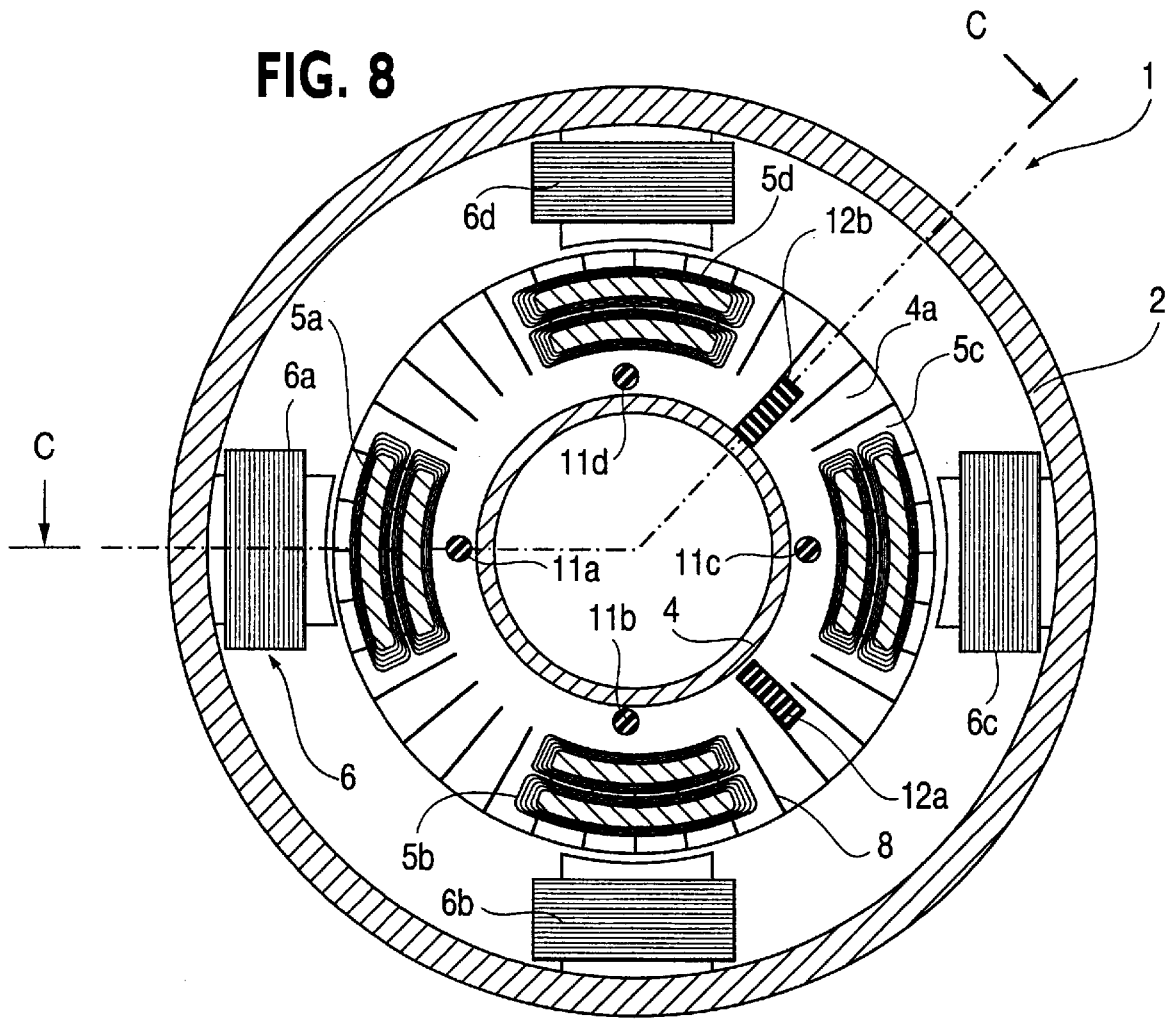
FIG. 8 is a sectional view taken along a line B—B of FIG. 7.

FIG. 7 is a side sectional view showing an arrangement of a displacement sensor of the thrust magnetic bearing 5 and the radial magnetic bearing 6 in the magnetic bearing apparatus 1 of the present invention, and FIG. 8 is a sectional view taken along a line B—B of FIG. 7. Here, the side sectional view shown in FIG. 7 corresponds to a sectional view taken along a line C—C of FIG. 8.

First displacement sensors such as thrust displacement sensors 11a, 11b, 11c and 11d to be used in the thrust magnetic bearing 5 are fixed in the same intervals respectively in the casing 2 through gaps from the upper face of the disk 4a of the rotor 4. These thrust sensors 11a, 11b, 11c and 11d detect the upper surface (in which no slit 8 is formed) in the vicinity of the inner circumference of the disk 4a, and the displacements of the rotor 4 in the axial direction and in the direction of inclination are determined by a thrust displacement sensor converter (not shown) and a signal processing circuit (not shown). The thrust magnetic bearing 5 is controlled in position by the control signal coming from the not-shown control unit, based on the displacement signals of the thrust displacement sensors 11a, 11b, 11c and 11d.

Second displacement sensors, such as radial displacement sensors 12a and 12b to be used in the radial magnetic bearing 6, are fixed in the casing 2 with a phase difference of 90 degrees through gaps from the outer circumference of the rotor 4 over the disk 4a. The radial displacement sensors 12a and 12b detect the outer circumference of the rotor 4, and the radial displacement of the rotor 4 is determined by a radial displacement sensor converter (not shown) and the signal processing circuit (not shown). The radial magnetic bearing 6 is controlled in position by the control signal coming from the not-shown control unit, based on the displacement signals of the radial displacement sensors 12a and 12b.

In FIG. 7, although the thrust displacement sensors 11a, 11b, 11c and 11d are fixed in the casing 2 through the gaps from the upper face of the disk 4a of the rotor 4, the thrust displacement sensors 11a, 11b, 11c and 11d may be fixed in the case 2 through the gap from the lower face of the disk 4a. Although the radial displacement sensors 12a and 12b are fixed in the casing 2 through the gaps from the outer circumference of the rotor 4 over the disk 4a, the radial displacement sensors 12a and 12b may be fixed in the casing 2 through the gaps from the outer circumference of the rotor 4 below the disk 4a or from the inner circumference of the rotor 4.

Here, the embodiment has four thrust displacement sensors and two radial displacement sensors. However, five degrees of freedom can be reliably detected by providing three or more thrust displacement sensors and two or more radial displacement sensors.

Figure 9:
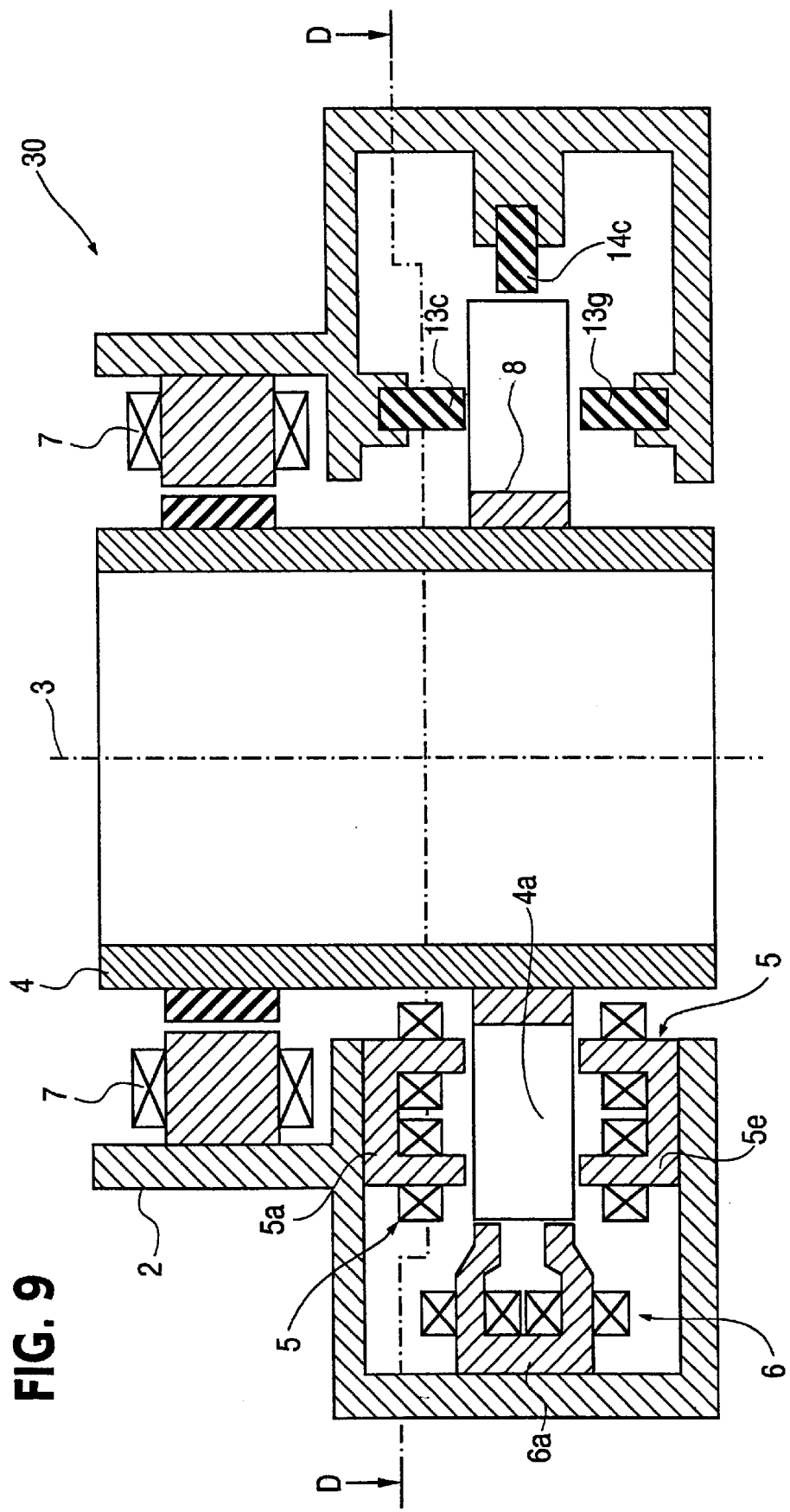
FIG. 9 is a side sectional view showing an other example of the arrangement of the displacement sensor of the thrust magnetic bearing and the radial magnetic bearing in the magnetic bearing apparatus.
Figure 10:
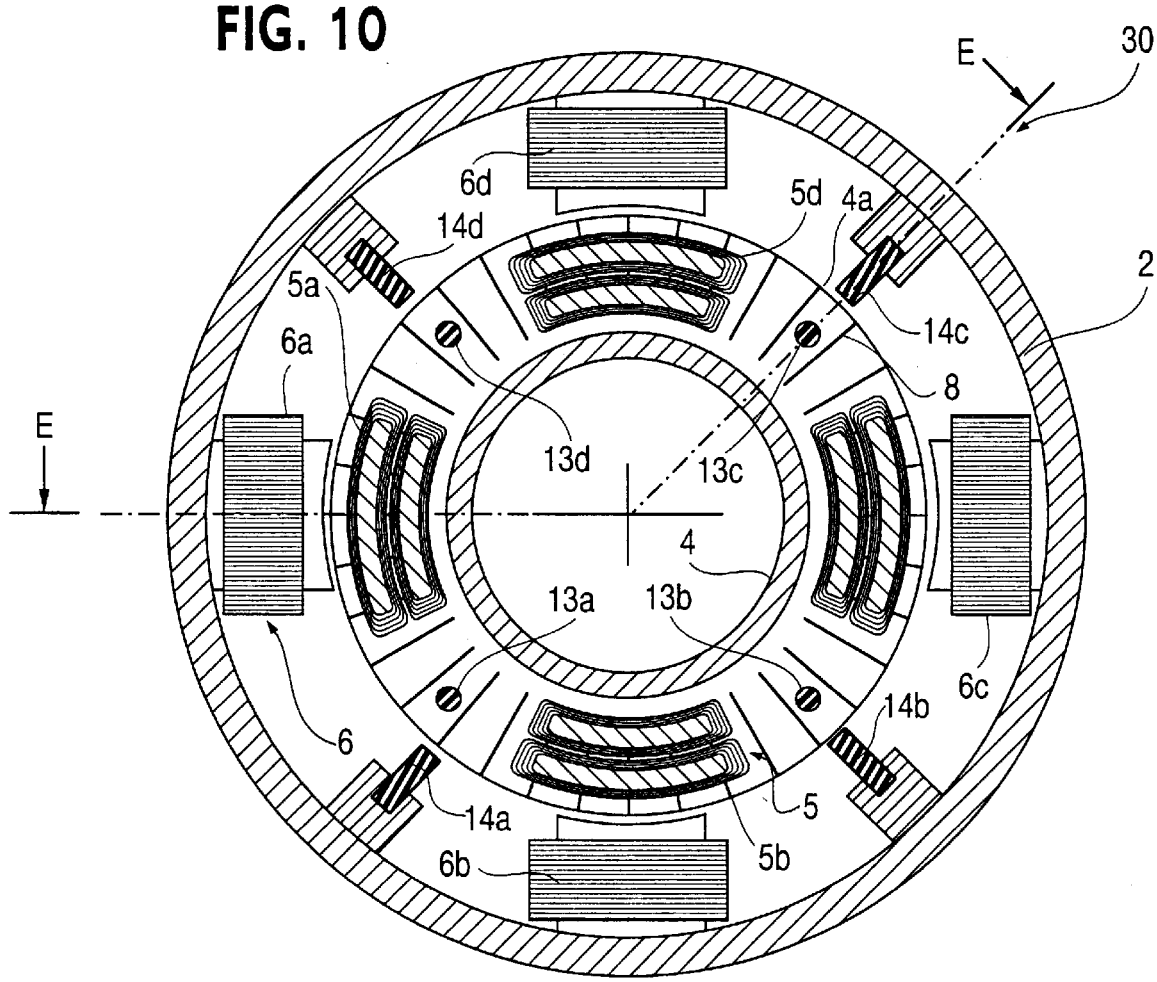
FIG. 10 is a sectional view taken along a line D—D of FIG. 9.

FIG. 9 is a side sectional view showing an arrangement of a displacement sensor of the thrust magnetic bearing 5 and the radial magnetic bearing 6 in a magnetic bearing apparatus 30 of the present invention, and FIG. 10 is a sectional view taken along a line D—D of FIG. 9. Here, the side section shown in FIG. 9 corresponds to a section taken along line E—E of FIG. 10.

Thrust displacement sensors 13a, 13b, 13c, 13d, 13e, 13f, 13g and 13h (the sensors 13e, 13f and 13h are not shown, but are respectively positioned below sensors 13a, 13b and 13d in a manner similar to that shown in FIG. 10) to be used in the thrust magnetic bearing 5 are fixed in the same intervals in the casing 2 through gaps from the upper face and lower surface of the disk 4a of the rotor 4. These thrust displacement sensors 13a, 13b, 13c, 13d, 13e, 13f, 13g and 13h detect the upper and lower surfaces (in which the slits 8 are formed) of the disk 4a, and the displacements of the rotor 4 in the axial direction and in the direction of inclination are determined by the thrust displacement sensor converter (not shown) and the signal processing circuit (not shown). The thrust magnetic bearing 5 is controlled in position by the control signal coming from the not-shown control unit, based on the displacement signals of these thrust displacement sensors 13a, 13b, 13c, 13d, 13e, 13f, 13g and 13h.

Radial displacement sensors 14a, 14b, 14c and 14d to be used in the radial magnetic bearing 6 are fixed in the casing 2 with a phase difference of 90 degrees through gaps from the outer circumference side surface of the disk 4a. These radial displacement sensors 14a, 14b, 14c and 14d detect the outer circumference side surface of the disk 4a, and the radial displacement of the rotor 4 is determined by a radial displacement sensor converter (not shown) and a signal processing circuit (not shown). The radial magnetic bearing 6 is controlled in position by a control signal coming from the not-shown control unit, based on the displacement signals of those radial displacement sensors 14a, 14b, 14c and 14d.

In FIGS. 9 and 10, although the thrust displacement sensors 13a, 13b, 13c, 13d, 13e, 13f, 13g and 13h are shown as being fixed in the casing 2 through the gaps from the upper and lower faces of the disk 4a of the rotor 4, more than three pairs of thrust displacement sensors may be arranged to form individual identical planes in the upper and lower places of the disk 4a.

Figure 11A:
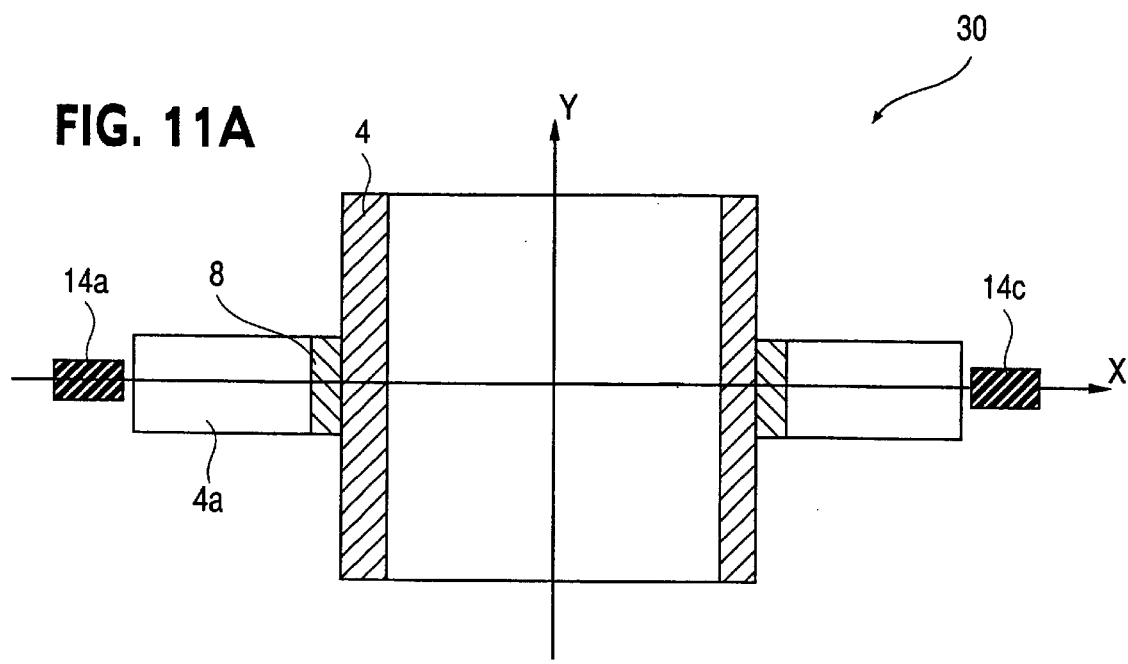
FIGS. 11A and 11B are diagrams showing a differential output signal of radial displacement sensors 14a and 14c of a magnetic bearing device 30 shown in FIGS. 9 and 10.
Figure 11B:
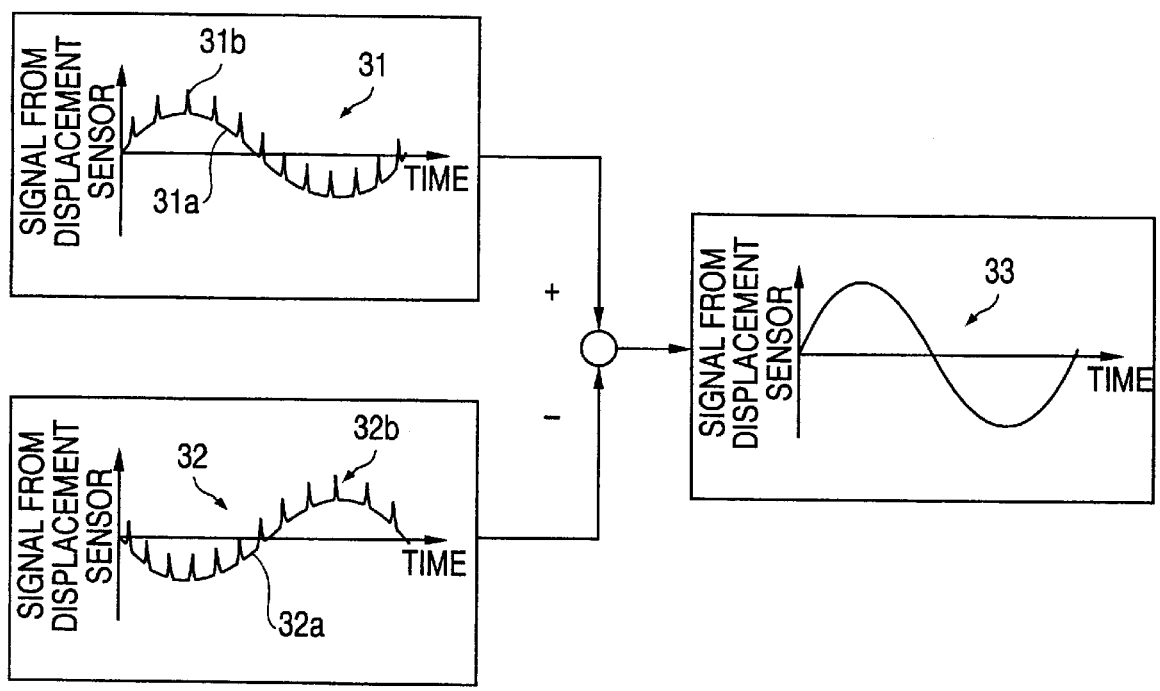

FIG. 11B is a diagram showing a differential output signal of the radial displacement sensors 14a and 14c of the magnetic bearing apparatus 30 shown in FIG. 11A. When the rotor 4 is rotated, the radial displacement sensors 14a and 14c output signals having the output waveforms 31 and 32, in which oscillatory waveforms 31a and 32a of rotary synchronous components and pulsating oscillatory waveforms 31b and 32b, as generated each time the slits 8 formed in the disk 4a of the rotor 4 pass through the detecting positions of the radial displacement sensors 14a and 14c, are superposed. The pulsating oscillatory waveforms 31b and 32b are error signals which are generated by the influences of the slits 8 and are independent of the oscillatory displacement of the rotor 4.

When the radial magnetic bearing 6 is levitationally controlled by using the output signal 31 of the radial displacement sensor 14a or the output signal 32 of the radial displacement sensor 14c, vibrations as caused by the pulsating oscillatory waveform 31b or 32b in accordance with the rotation of the rotor 4 are generated to lessen the levitating characteristics of the rotor 4. Therefore, by using a differential signal 33 of the two output signals 31 and 32 for the levitation control, the pulsating oscillatory waveforms 31b and 32b as generated by the influences of the slits 8 can be eliminated or reduced to maintain the satisfactory levitating characteristics.

Moreover, the detection error caused by the deformation of the disk 4a due to the centrifugal force and the thermal expansion can be reduced, and the detection sensitivity of the radial displacement sensors can be improved to twice that of conventional sensors, thereby providing a magnetic bearing apparatus which has higher positioning accuracy and higher stability.

Apart from the method shown in FIGS. 11A and 11B, the differential signals may likewise be generated by the pairs of the radial displacement sensors 14b and 14d, and the thrust displacement sensors 13a and 13e, 13b and 13f, 13c and 13g, and 13d and 13h, so that they can also be used to control the radial magnetic bearing 6 and the thrust magnetic bearing 5.

Figure 12:
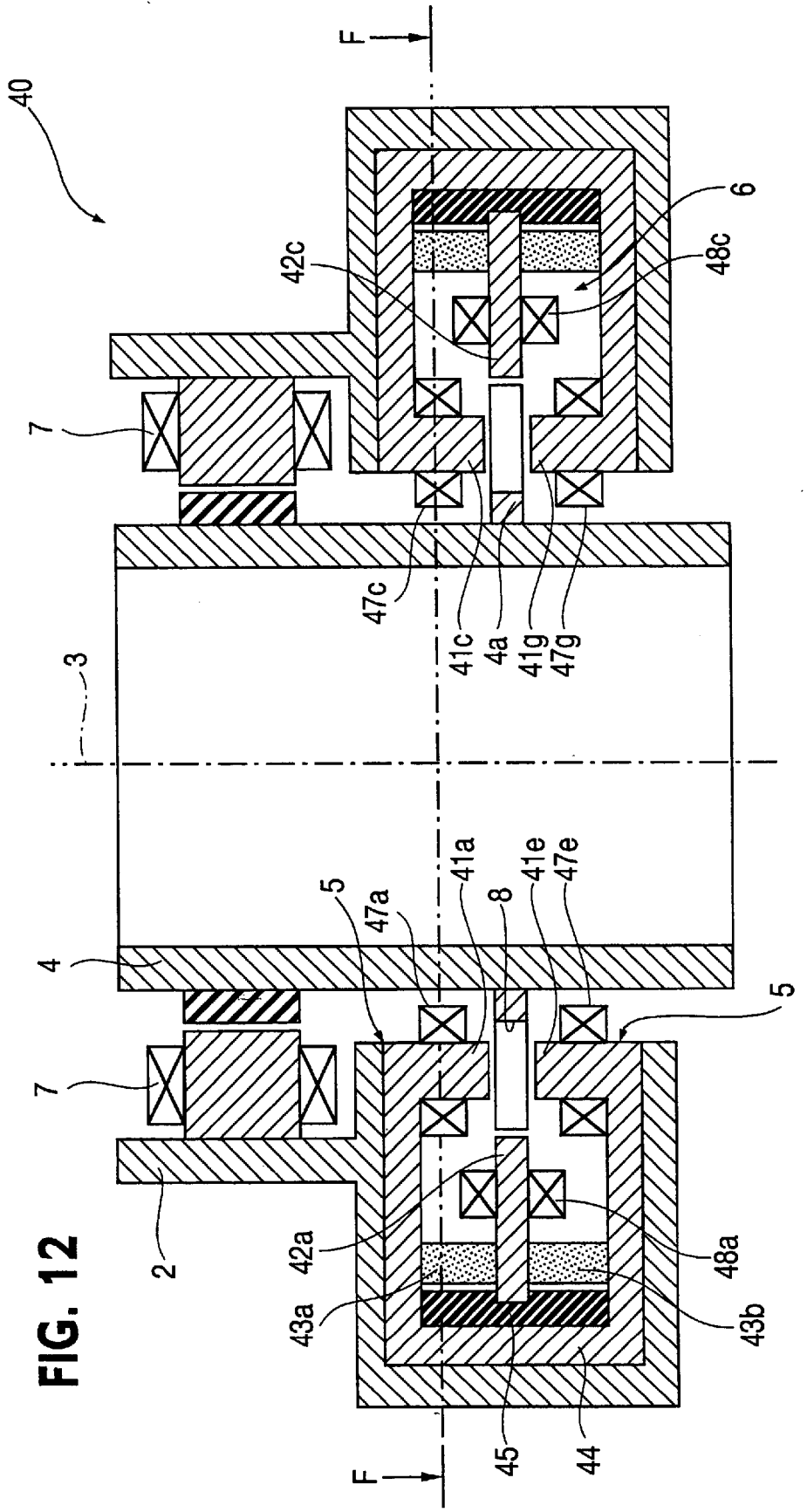
FIG. 12 is a side sectional view showing a magnetic bearing apparatus according to a fourth embodiment of the present invention.
Figure 13:
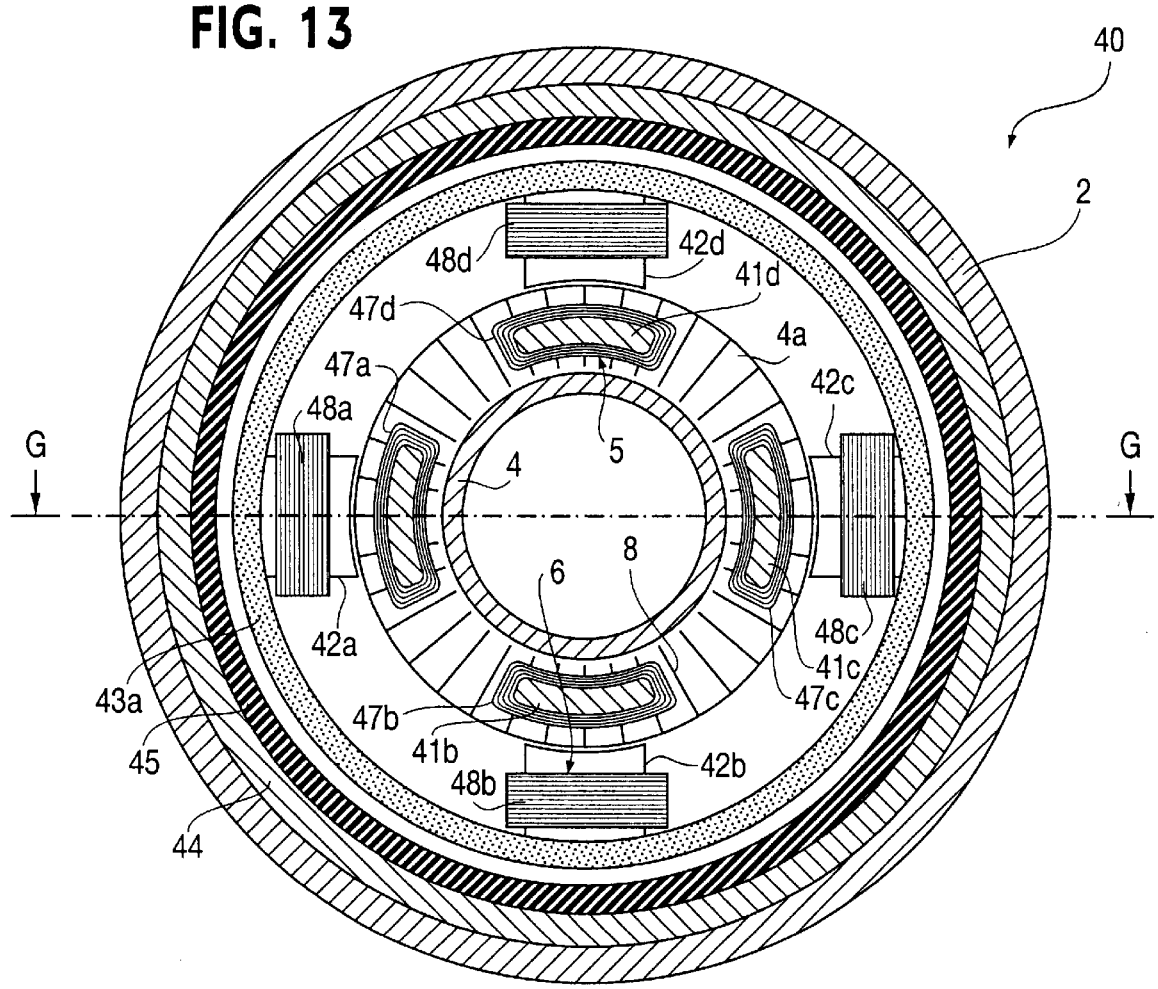
FIG. 13 is a sectional view taken along a line F—F of FIG. 12.
Figure 14:
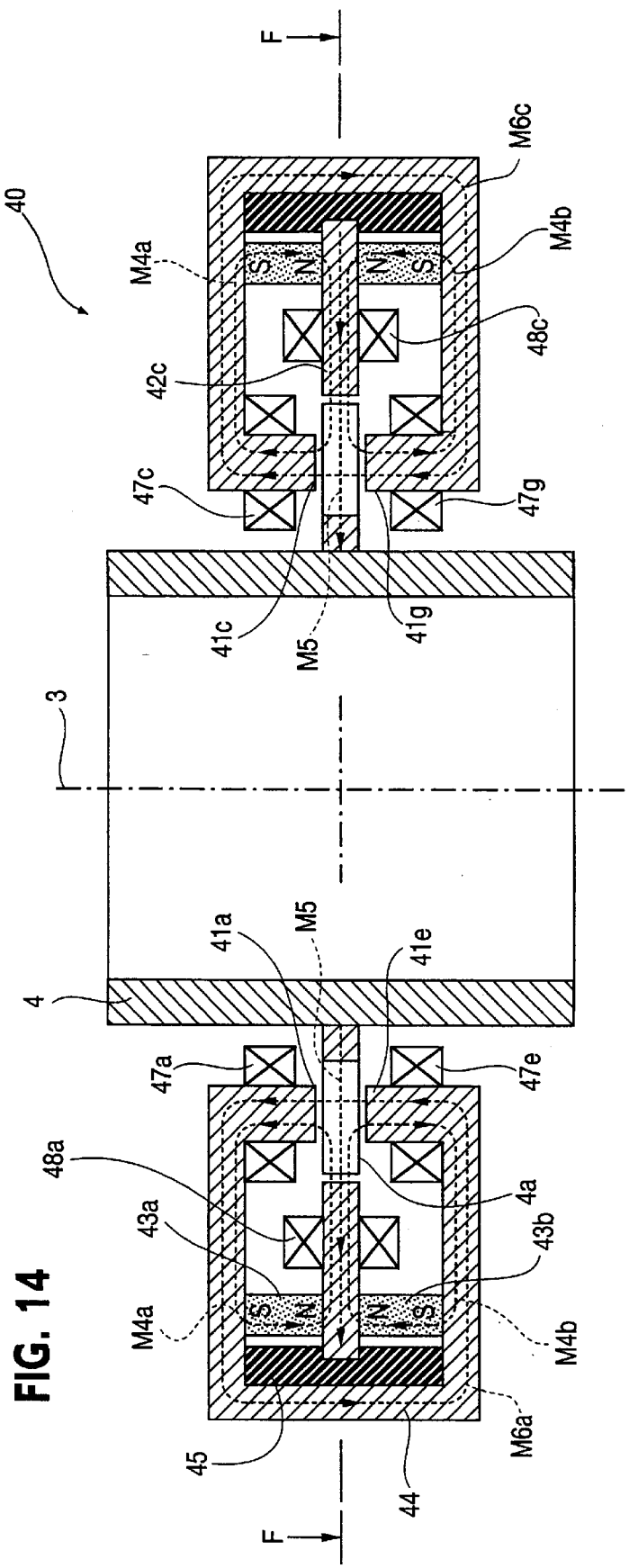
FIG. 14 is a diagram showing the flows of magnetic fluxes of the thrust magnetic bearing and the radial magnetic bearing with reference to the sectional view shown in FIG. 12.

FIG. 12 is a side sectional view showing a magnetic bearing device 40 according to the fourth embodiment of the present invention, and FIG. 13 is a sectional view taken along a line F—F of FIG. 12. Here, the side sectional view shown in FIG. 12 corresponds to a sectional view taken along a line G—G of FIG. 13. Further, FIGS. 14 and 15 are diagrams showing the flows of the magnetic fluxes of the thrust magnetic bearing 5 and the radial magnetic bearing 6 and are drawn to correspond to FIGS. 12 and 13, respectively.

The magnetic bearing apparatus 40 according to this embodiment includes: the rotor 4 accommodated in the casing 2 and having the disk 4a in the vicinity of the lower end of the rotational axis 3, and upper electromagnets 41a, 41b, 41c and 41d and lower electromagnets 41e, 41f, 41g and 41*h* (the electromagnets 41*f* and 41*h* are not shown) mounted on the upper and lower surfaces of the disk 4*a* for supporting the rotor 4 in a non-contact manner with respect to the thrust direction and the inclination of the rotor 4 by making their magnetic poles confronting each other through gaps. The upper electromagnets 41*a*, 41*b*, 41*c* and 41*d* and the lower electromagnets 41*e*, 41*f*, 41*g* and 41*h* constitute the thrust magnetic bearing 5. At the outer circumference of the disk 4*a* of the rotor 4, electromagnets 42*a*, 42*b*, 42*c* and 42*d* are mounted for supporting the rotor 4 in a non-contact manner with respect to the radial direction of the rotor 4 by making their magnetic poles confront through gaps. These electromagnets 42*a*, 42*b*, 42*c* and 42*d* constitute the radial magnetic bearing 6.

The electric motor 7 is disposed above the upper electromagnets 41*a*, 41*b*, 41*c* and 41*d* in the casing 2. The electric motor 7 is used for rotating the rotor 4.

In the outer circumference of the disk 4*a* of the rotor 4, there are provided slits 8 which are formed in the same intervals in the radial direction and extended through in the direction of the rotational axis 3. For example, thirty six slits 8 are provided, but other numbers are possible. These slits 8 act, as in the first embodiment, to reduce the core loss or the eddy current loss which is caused when the disk 4*a* of the rotor 4 is rotated by the electric motor 7.

Further, in this embodiment, two annular magnets 43*a* and 43*b* are arranged concentrically with respect to the casing 2 on the rotational axis 3 of the rotor 4. These annular magnets 43*a* and 43*b* are magnetized in opposite directions to each other with respect to the direction of the rotational axis 3, and are magnetically connected at their one end surfaces on their opposed sides to the electromagnets 42*a*, 42*b*, 42*c* and 42*d* of the radial magnetic bearing 6. On the other hand, the other end surfaces of the annular magnets 43*a* and 43*b* are magnetically connected to the upper electromagnets 41*a*, 41*b*, 41*c* and 41*d* and the lower electromagnets 41*e*, 41*f*, 41*g* and 41*h* of the thrust magnetic bearing 5, respectively.

The upper electromagnets 41*a*, 41*b*, 41*c* and 41*d* and the lower electromagnets 41*e*, 41*f*, 41*g* and 41*h* of the thrust magnetic bearing 5 are magnetically connected by the annular yoke portion 44, which is concentrically mounted in the casing 2.

The electromagnets 42*a*, 42*b*, 42*c* and 42*d* of the radial magnetic bearing 6 are fixed in the casing 2 with a phase difference of 90 degrees in the circumferential direction and shaped to protrude therefrom toward the rotational axis 3. These electromagnets 42*a*, 42*b*, 42*c* and 42*d* of the radial magnetic bearing 6 constitute an annular magnetic pole ring 46 as a whole. The magnetic pole ring 46 is fixed by a support member 45 of a non-magnetic material, for example, aluminum, stainless steel and the like, which is concentrically mounted in the casing 2 and fitted in the annular yoke portion 44.

Control coils 47*a*, 47*b*, 47*c*, 47*d*, 47*e*, 47*f*, 47*g* and 47*h* (the control coils 47*f* and 47*h* are not shown) are wound around the upper electromagnets 41*a*, 41*b*, 41*c* and 41*d* and the lower electromagnets 41*e*, 41*f*, 41*g* and 41*h* of the thrust magnetic bearing 5, respectively. Likewise, control coils 48*a*, 48*b*, 48*c* and 48*d* are wound around the electromagnets 42*a*, 42*b*, 42*c* and 42*d* of the radial magnetic bearing 6.

As shown in FIG. 14, magnetic fluxes M4*a* and M4*b* generated from the annular magnets 43*a* and 43*b* pass through the electromagnets 42*a*, 42*b*, 42*c* and 42*d* of the radial magnetic bearing 6 to form a closed loop passing through the upper electromagnets 41*a*, 41*b*, 41*c* and 41*d* and the lower electromagnets 41*e*, 41*f*, 41*g* and 41*h* of the thrust magnetic bearing 5.

Here, in the case when the rotor 4 is displaced leftward of FIG. 14 in the radial direction so that the radial gap length of the lefthand side is reduced, for example, the rightward magnetic force acts to stabilize the rotor 4 by feeding an electric current to the control coils 48*a* and 48*c* to weaken the magnetic flux (attraction force) to pass through the narrowed gap and to strengthen the magnetic flux (attraction force) to pass through the gap of the widened radial length, as located on the righthand side.

As shown in FIG. 15, a magnetic flux M5 that is established by the control coils 48*a* and 48*c* forms a closed loop of the electromagnet 42*a*→the magnetic pole ring 46→the electromagnet 42*c*→the disk 4*a*. As a result, the magnetic fluxes M4*a* and M4*b* pass through the electromagnet 42*a* and the magnetic flux M5 are directed in the opposite directions to cancel each other, whereas the magnetic fluxes M4*a* and M4*b* to pass through the electromagnet 42*c* and the magnetic flux M5 are directed in the same direction to strengthen each other. In that way, stabilized levitation control in the radial direction can be achieved by the aforementioned control coils 48*a* and 48*c*.

Likewise, the magnetic fluxes which migrate between the control coils 48*b* and 48*d* strengthen each other to effect the stable levitation control as in the aforementioned case of the control coils 48*a* and 48*c*.

In the case when the rotor 4 is displaced downward of FIG. 14 in the axial direction so that the axial gap length as located on the lower side of the drawing is reduced, the upward magnetic force acts to stabilize the rotor 4 by feeding an electric current to the control coils 47*a*, 47*b*, 47*c*, 47*d*, 47*e*, 47*f*, 47*g* and 47*h* to weaken the magnetic flux (attraction force) of the gap and to strengthen the magnetic flux (attraction force) of the widened axial length as located on the upper side.

Here, a magnetic flux M6*a* established by the control coils 47*a* and 47*e* forms a closed loop of the electromagnet 41*a*→the annular yoke portion 44→the electromagnet 41*e*→the disk 4*a*. As a result, the magnetic fluxes M4*b* and M6*a* passing through the electromagnet 41*e* and the magnetic flux M6*a* are directed in the opposite directions to cancel each other, whereas the magnetic fluxes M4*a* and M6*a* passing through the electromagnet 41*a*, and the magnetic flux M6*a* are directed in the same direction to strengthen each other. In that way, stabilized levitation control in the axial direction can be achieved by the aforementioned control coils 47*a* and 47*e*.

The stabilized levitation control in the axial direction can also be achieved by a magnetic flux M6*b* (not shown) established by the control coils 47*b* and 47*f*, a magnetic flux M6*c* established by the control coils 47*c* and 47*g*, and a magnetic flux M6*d* (not shown) established by the control coils 47*d* and 47*h*. The magnetic fluxes M6*a*, M6*b*, M6*c* and M6*d* are controlled independently of one another so that the stabilization is also realized for the direction of inclination of the rotor 4.

Here, the individual control coils are connected at their input ends with the output end of a not-shown stabilized levitation controller. This stabilized levitation controller can be exemplified by the well-known zero-power control type and is constituted to control the currents or voltages of the individual control coils by introducing the output signals of the not-shown displacement sensors.

The magnetic bearing apparatus of the present invention is not limited to the configurations of the respective embodiments.

In the embodiments as explained above, the conductivity adjusting unit is exemplified by the slits 8 formed in the disk 4a. However, the invention can be realized by methods and structures other than that exemplification. One of these methods or structures uses the "anisotropic conductive material". As this anisotropic conductive material, there can be listed the Hitachi Anisotropic Conductive Film, named "Anisolm (AC-2101)", as available from Hitachi Chemical Co., Ltd., or Anisotropic Conductive Pastes, "XAP Series", as available from Toshiba Chemical Corp. These materials have characteristics capable of affording an electric conductivity only in a predetermined direction necessary to feed electricity, by adhering or applying it to the surface of the disk 4a and by applying a pressure in that predetermined direction. In the case of the above embodiments, the conductivity is made anisotropic by applying the pressure in a direction different from that, in which the slits 8 are formed, the conductive adjusting unit can be expected to provide effects similar to those of the case of the formed slits so that it can suffice its functions.

In the description of the above embodiments, the number of slits 8 is set to thirty-six, however, the invention is not be limited to that particular number. In the case when the number of slits is increased, the core loss, especially the eddy current loss, caused by the rotation of the rotor 4 is reduced, so that the rotational characteristics are improved. However, the mechanical strength of the disk 4a of the rotor 4 is weakened. Therefore, the number and spacing of the slits are determined based on the capacity of the electric motor 7, the allowable calorific power of the rotor 4, the mechanical strength and the number of rotations of the disk 4a, and the shape of the slit 8 themselves. According to the present invention, the formation of only one slit could achieve higher effects than those of the conventional magnetic bearing apparatus.

In the above embodiments, the slits 8 are formed in the disk 4a. However, the rotor and the disk may be integrally molded then to form the slits. In this modification, the conductivity adjusting unit includes just the slits.

Further, in the above embodiments, slits are made by forming only in the radial direction and in the thrust direction. However, the improvements by way of the present invention can be expected in the case in which the slits are formed in another direction. More specifically, it is desired to prevent the eddy currents to be established in the surface of the disk 4a from moving in the rotational direction of the disk 4a. By forming the slits to have a small inclination, such as a helical shape for example, from the radial direction of the rotor, a contribution can be made to the reduction in the eddy current. In other words, the angle of forming the slits can be arbitrarily considered according to the design.

In the above embodiments, the conductivity adjusting unit is constituted by forming the slits in the disk 4a. However, the effects of the present invention can also be expected even if a plurality of plate-shaped members are jointed at a predetermined intervals around the rotor to form a disk-shaped unit as a whole.

According to the present invention, as described above, it is possible to realize a magnetic bearing apparatus capable of reducing the size in the direction of the rotational axis and capable of reducing the contamination in the apparatus.

The foregoing discussion discloses and describes merely an exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. The entire contents of Japanese Patent Application H10-132827, filed May 15, 1998, is incorporated herein by reference.

What is claimed is:

1. A magnetic bearing apparatus capable of supporting a rotatable rotor in a non-contact manner, comprising:

a disk connected around the rotor and having a side surface and a plane surface perpendicular to the side surface;

a first electromagnet disposed around the side surface of the disk, for supporting the rotor in said non-contact manner in a radial direction;

a second electromagnet disposed around the plane surface of the disk, for supporting the rotor in said non-contact manner in an axial direction;

at least one slit formed in the disk at a predetermined angle in such a manner that the at least one slit is extended entirely through the disk in the axial direction and extending partially through the disk in the radial direction of the disk, for making a conductivity discontinuous with respect to the axial direction and a rotational direction of the rotor;

a first displacement sensor facing a side surface of the rotor, for detecting a first displacement of the rotor in the radial direction so as to correct the first displacement sensor by using the first electromagnet; and a second displacement sensor facing the plane surface of the rotor at a location separate from where the at least one slit is formed in the disk, for detecting a second displacement of the rotor in the axial direction so as to correct the second displacement by using the second electromagnet.

2. The magnetic bearing apparatus according to claim 1, wherein the at least one slit is formed in a plane containing the axial direction of disk and the radial direction of the disk.

3. The magnetic bearing apparatus according to claim 1, wherein the rotor is cylindrically shaped.

4. The magnetic bearing apparatus according to claim 3, further comprising a motor that rotates the rotor, and which is disposed so as to face an outer surface of the rotor.

5. The magnetic bearing apparatus according to claim 3, further comprising a motor that rotates the rotor, and which is disposed so as to face an inner surface of the rotor.

6. A magnetic bearing apparatus capable of supporting a rotatable rotor in a non-contact manner, comprising:

a disk connected around the rotor and having a side surface and a plane surface perpendicular to the side surface;

a first electromagnet disposed around the side surface of the disk, for supporting the rotor in said non-contact manner in a radial direction;

a second electromagnet disposed around the plane surface of the disk, for supporting the rotor in said non-contact manner in an axial direction;

at least one slit formed in the disk at a predetermined angle in such a manner that the at least one slit is extended entirely through the disk in the axial direction and extending partially through the disk in the radial direction of the disk, for making a conductivity discontinuous with respect to the axial direction and a rotational direction of the rotor;

a first displacement sensor facing the side surface of the disk, for detecting a first displacement of the rotor in the radial direction so as to correct the first displacement sensor by using the first electromagnet; and a second displacement sensor facing the plane surface of the disk, for detecting a second displacement of the rotor in the axial direction so as to correct the second displacement by using the second electromagnet.

7. The magnetic bearing apparatus according to claim 6, wherein the at least one slit is formed in a plane containing the axial direction of disk and the radial direction of the disk.

8. The magnetic bearing apparatus according to claim 6, wherein the rotor is cylindrically shaped.

9. The magnetic bearing apparatus according to claim 8, further comprising a motor that rotates the rotor, and which is disposed so as to face an outer surface of the rotor.

10. The magnetic bearing apparatus according to claim 8, further comprising a motor that rotates the rotor, and which is disposed so as to face an inner surface of the rotor.

11. A magnetic bearing apparatus capable of supporting a rotatable rotor in a non-contact manner, comprising:

a disk connected around the rotor;

a first electromagnet disposed around a side surface of the disk, for supporting the rotor in said non-contact manner in a radial direction;

a second electromagnet disposed around the plane surface perpendicular to the side surface of the disk, for supporting the rotor in said non-contact manner in an axial direction;

at least one slit formed in the disk at a predetermined angle in such a manner that the at least one slit is extended entirely through the disk in the axial direction and extending partially through the disk in the radial direction of the disk, for making a conductivity discontinuous with respect to the axial direction and a rotational direction of the rotor, wherein the first electromagnet generates a first magnetic flux and the second electromagnet generates a second magnetic flux, and the first magnetic flux and the second magnetic flux form magnetic paths in a plane that is approximately parallel to a plane formed by the at least one slit.

12. The magnetic bearing apparatus according to claim 11, wherein the at least one slit is formed in a plane containing the axial direction of disk and the radial direction of the disk.

13. The magnetic bearing apparatus according to claim 11, wherein the rotor is cylindrically shaped.

14. The magnetic bearing apparatus according to claim 13, further comprising a motor that rotates the rotor, and which is disposed so as to face an outer surface of the rotor.

15. The magnetic bearing apparatus according to claim 13, further comprising a motor that rotates the rotor, and which is disposed so as to face an inner surface of the rotor.

16. A magnetic bearing apparatus capable of supporting a rotatable rotor in a non-contact manner, comprising:

a disk connected around the rotor;

an electromagnet disposed around a side surface of the disk and plane surfaces perpendicular to the side surface of the disk, for supporting the rotor in said non-contact manner in a radial direction and an axial direction;

a magnet connected to the electromagnet for generating a magnetic flux in a magnetic path made by the electromagnet; and at least one slit formed in the disk at a predeterimined angle in such a manner that the at least one slit is extended entirely through the disk in the axial direction and extending partially through the disk in the radial direction of the disk, for making a conductivity discontinuous with respect to the axial direction and a rotational direction of the rotor.

17. The magnetic bearing apparatus according to claim 16, wherein the at least one slit is formed in a plane containing the axial direction of disk and the radial direction of the disk, and wherein the magnet has an annular shape.

18. The magnetic bearing apparatus according to claim 16, wherein the rotor is cylindrically shaped.

19. The magnetic bearing apparatus according to claim 18, further comprising a motor that rotates the rotor, and which is disposed so as to face an outer surface of the rotor.

20. The magnetic bearing apparatus according to claim 18, further comprising:

a vertical projection that is disposed within an inner region of the rotor; and a motor that rotates the rotor, and which is disposed so as to face an inner surface of the rotor, wherein the motor is mounted on the vertical projection so as to be rigidly supported within the inner region of the rotor.

\* \* \* \* \*